United States Patent
Boisserie et al.

(10) Patent No.: US 10,834,471 B2
(45) Date of Patent: Nov. 10, 2020

(54) METHOD AND DEVICE FOR CONTROLLING TRANSMISSION AND RECEPTION OF FRAMES IN A BIDIRECTIONAL VIDEO NETWORK

(71) Applicant: PSA AUTOMOBILES SA, Poissy (FR)

(72) Inventors: Antony Boisserie, Wissous (FR); Julien Poussard, Paris (FR); Gregory Cardon, Les Clayes sous Bois (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/605,175

(22) PCT Filed: Mar. 23, 2018

(86) PCT No.: PCT/FR2018/050719
§ 371 (c)(1),
(2) Date: Oct. 15, 2019

(87) PCT Pub. No.: WO2018/193176
PCT Pub. Date: Oct. 25, 2018

(65) Prior Publication Data
US 2020/0128300 A1  Apr. 23, 2020

(30) Foreign Application Priority Data

Apr. 21, 2017 (FR) ...................... 17 53468

(51) Int. Cl.
*H04N 21/61* (2011.01)
*H04N 21/845* (2011.01)
(Continued)

(52) U.S. Cl.
CPC ... *H04N 21/6131* (2013.01); *H04N 21/41422* (2013.01); *H04N 21/6437* (2013.01);
(Continued)

(58) Field of Classification Search
CPC .......... H04N 21/6131; H04N 21/6437; H04N 21/8456; H04N 21/41422; H04W 4/40; H04W 72/0446; H04W 84/20
See application file for complete search history.

(56) References Cited

U.S. PATENT DOCUMENTS

2014/0211095 A1* 7/2014 Dickens ........... H04N 21/43635
348/723
2017/0245138 A1* 8/2017 Waldner ................... G07C 5/08

FOREIGN PATENT DOCUMENTS

WO   20160181053 A1   11/2016

OTHER PUBLICATIONS

International Search Report for PCT/FR2018/050719 dated Jun. 18, 2018.
Written Opinion for PCT/FR2018/050719 dated Jun. 18, 2018.

* cited by examiner

*Primary Examiner* — Pinkal R Chokshi
(74) *Attorney, Agent, or Firm* — Sandberg Phoenix & von Gontard, P.C.

(57) ABSTRACT

A device (DC) for controlling the transmission of frames by a master component (OM) or slave component (OE1) of a communication network (RC) capable of bidirectional transmission of non-video data frames, in timeslots defined by a table. This device (DC) is designed, when the so called receiver component (OM) receives, in a time slot having a first duration, a frame of non-video data transmitted by a so-called emitter component (OE1) in a second duration starting at the same time as the first duration and strictly less than said first duration, to trigger a delay of a third duration in the range between the second and first durations, and, when the end of this delay occurs while the frame of
(Continued)

non-video data has not been fully received, to order the deletion in the receiver component (OM) of received data of this frame of non-video data.

9 Claims, 1 Drawing Sheet

(51) Int. Cl.
   *H04N 21/414* (2011.01)
   *H04W 4/40* (2018.01)
   *H04N 21/6437* (2011.01)
   *H04W 72/04* (2009.01)
   *H04W 84/20* (2009.01)

(52) U.S. Cl.
   CPC .......... *H04N 21/8456* (2013.01); *H04W 4/40* (2018.02); *H04W 72/0446* (2013.01); *H04W 84/20* (2013.01)

METHOD AND DEVICE FOR CONTROLLING TRANSMISSION AND RECEPTION OF FRAMES IN A BIDIRECTIONAL VIDEO NETWORK

CROSS-REFERENCE TO RELATED APPLICATIONS

This application is the US National Stage under 35 USC § 371 of International Application No. PCT/FR2018/050719, filed 23 Mar. 2018 which claims priority to French Application No. 1753468 filed 21 Apr. 2017, both of which are incorporated herein by reference.

BACKGROUND

The invention relates to communication networks capable of bidirectional transmission of non-video data frames and of unidirectional transmission of video frames between the master and slave components, and more specifically to controlling the transmission of non-video data frames between components of this type.

As is known to one of skill in the art, some communication networks of the aforementioned type, in particular those known as low-voltage differential signaling (LVDS) networks, comprise a master component and at least one slave component arranged so as to exchange non-video data frames bidirectionally, in timeslots (or time slices) defined by a schedule table, and to exchange video data frames unidirectionally.

The use of a schedule table of this type advantageously prevents two components (or nodes) from transmitting non-video data frames substantially simultaneously, which would cause them to be lost. For example, the loss of a screen parameterization non-video data frame between a multimedia computer and a touchscreen of a vehicle could cause a parameterization commanded by a passenger not to be taken into account, and thus have an undesirable effect on the touchscreen.

However, a schedule table of this type does not make it possible to prevent every problem. In particular, it sometimes happens that some of the non-video data of a frame have not yet been transmitted by a component at the end of the timeslot assigned to it by the table. In this case, this component completes its transmission in the following timeslot, while another component has started transmitting in the following timeslot. There is thus a risk of the two frames colliding, and thus a risk of these two frames being lost. A situation of this type may occur for example in the event of a computational (or CPU) peak load due to a task other than the frame transmission, since this can lead to greater-than-expected inter-byte times in the frame that is being transmitted (as may be the case for example during telephone communication via a Bluetooth application).

To improve the situation, it has been proposed, when a timeslot intended for the transmission of a non-video data frame by a master component or slave emitter starts, to trigger a delay of a duration strictly less than that of the timeslot, and, when the end of this delay occurs while the non-video data frame has not been fully received, to forbid the emitter component to finish its transmission. However, when the emitter component does not have time to emit its frame in the predefined timeslot, the receiver component receives a truncated frame but does not know that it will not receive the end of this truncated frame and is thus left waiting for this frame end. As a result, when the emitter component transmits the following frame [[to it]], the receiver component interprets the start of this new frame as the continuation of the preceding truncated frame, and thus has no means of resynchronizing itself with the emitter component. This results in a definitive loss of bidirectional LVDS communication until the next startup. For example, in a vehicle this may translate to a loss of the touchscreen commands or to a downgraded mode being triggered or even to a loss of communication with the cameras of a driver assistance system (for example an ADAS (advanced driver-assistance system)).

SUMMARY

The object of the invention is thus in particular to overcome the drawback described above.

For this purpose a method is proposed, on the one hand, for controlling the transmission of frames by a master component and slave component(s) of a communication network capable of bidirectional transmission of non-video data frames, in timeslots defined by a table, and of unidirectional transmission of video data frames, and, on the other hand, comprising a step in which, when a timeslot having a first duration and intended for the transmission of at least one non-video data frame by a so-called emitter component starts, a first delay of a second duration strictly less than the first duration is triggered, and, when the end of this first delay occurs while the non-video data frame has not been fully received, the emitter component is forbidden to finish its transmission.

This method is characterized in that, in the step thereof, when a receiver component receives the non-video data frame in the timeslot, a second delay of a third duration in the range between the second and first duration is triggered in the receiver component, and, when the end of this second delay occurs while the non-video data frame has not been fully received, the received data of this non-video data frame are deleted in the receiver component.

Thus, it is then certain that the receiver component is available for new reception from the start of the following timeslot.

The control method according to the invention may include further features, which may be taken separately or in combination, in particular:

- in the step, when the receiver component is a slave component, the second delay of a third duration may be triggered at the start of the reception of the non-video data frame by this receiver slave component;
- in the step, when the receiver component is a master component, the second delay of a third duration may be triggered at the start of the timeslot used by the emitter slave component for transmitting the non-video data frame;
- the third duration may, for example, be in the range between 3.5 ms and 4.5 ms when the first duration is equal to 5 ms. For example, the third duration may be equal to 4 ms.

Also proposed is a control device for controlling the transmission of frames by a master component or a slave component of a communication network capable of bidirectional transmission of non-video data frames, in timeslots defined by a table, and of unidirectional transmission of video data frames.

This device is characterized in that it is set up, when the receiver component receives, in a timeslot of a first duration, a non-video data frame transmitted by another emitter component in a second duration starting at the same time as the first duration and strictly less than the first duration, to trigger a delay of a third duration in the range between the second and first durations, and, when the end of this delay occurs while the non-video data frame has not been fully received, to order the deletion in its receiver component of received data of this non-video data frame.

Additionally, a component (master or slave) is proposed which is suitable for connection to a communication network capable of bidirectional transmission of non-video data frames, in timeslots defined by a table, and of unidirectional transmission of video data frames, and comprising a control device of the type set out above.

Further a vehicle, optionally a motor vehicle, is proposed comprising, on the one hand, a communication network capable of bidirectional transmission of non-video data frames, in timeslots defined by a table, and of unidirectional transmission of video data frames, and, on the other hand, at least two components of the type set out above, which are connected to the communication network.

The method is particularly well-suited to, but not limited to, the case where the communication network is of the LVDS type.

DESCRIPTION OF THE FIGURES

Further features and advantages of the method will be apparent from examining the detailed description below and the accompanying drawings, in which.

DESCRIPTION OF THE FIGURES

The object is to propose a control method and an associated control device DC for making it possible to control the transmission of frames by a master component OM and at least one slave component OEj of a communication network RC capable of bidirectional transmission of non-video data frames, in timeslots defined by a table (schedule), and of unidirectional transmission of video data frames.

Hereinafter, by way of non-limiting example, it is assumed that the communication network RC is installed in a motor vehicle V, such as a car. However, the invention is not limited to this application. Specifically, it relates to any system, installation or apparatus that may comprise at least one communication network capable of bidirectional transmission of non-video data frames and of unidirectional transmission of video data frames. It thus relates in particular to vehicles, whether these be land, sea (or river) or air vehicles, to installations, optionally of the industrial type, and to buildings.

Moreover, hereinafter, by way of non-limiting example, it is assumed that the communication network RC is of the LVDS (low-voltage differential signaling) type. However, the invention is not limited to this type of communication network. The invention relates generally to any communication network capable of bidirectional transmission of non-video data frames and of unidirectional transmission of video data frames.

Figure 1:
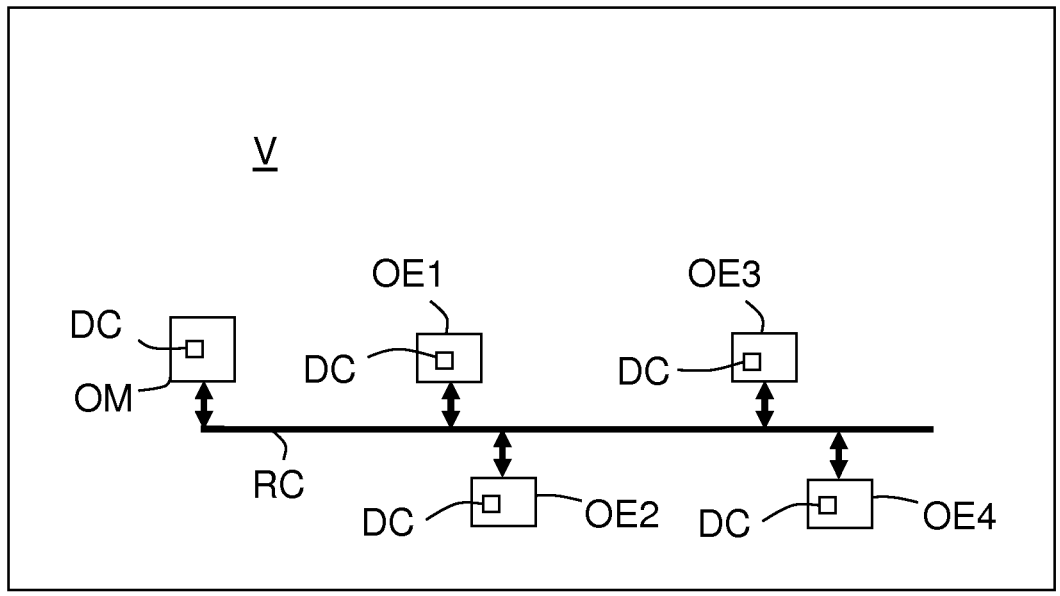
FIG. 1 schematically and functionally illustrates a vehicle comprising a communication network to which a master component and slave components, each equipped with a control device, are connected, and FIG. 2 schematically illustrates a first example of a time diagram representing a write frame ($T_E$), a part ($pt_{nt}$) of which has not been transmitted at the end of the first delay associated with the timeslot thereof.

FIG. 1 schematically represents a vehicle comprising a non-limiting example of a (communication) network RC. In this example, the network RC (of the LVDS type) comprises a bus, to which a master component (or node) OM and four slave components (or nodes) OE1 to OE4 (j=1 to 4) are connected. However, the number of slave components OEj may take any value greater than or equal to one (1).

The master component OM and the slave components OEj may be of any type as long as they are involved in the acquisition or use of video data. For example, in the case of a car, the maser component OM may be a multimedia computer or an ADAS supervisor, and a slave component OEj may be a touchscreen or a camera that captures images of the external environment.

Within the network RC, the master component OM and the slave components OEj are authorized to transmit non-video data frames in timeslots ct that are predefined in a table (schedule), which is known to each of them.

It will be recalled that in an LVDS network the master component OM may transmit either "write" non-video data frames $T_E$ or "header" non-video data frames $T_H$, whereas each slave component OEj may transmit "read" non-video data frames in response to respective header non-video data frames $T_H$. Moreover, a header frame $T_H$ and the associated read frame are transmitted in the same timeslot ct defined by the table.

A write frame $T_E$ is intended to transmit non-video data to a slave component OEj, and contains the following fields, always transmitted in the same order:
  a synchronization field (SYNC), indicating the start of the frame,
  a field (DEV ADDR) indicating the component (serializer, deserializer or slave microcontroller) to which the frame is addressed,
  an identifier (ID), which makes it possible for the application of the receiving slave component OEj to know how to decode the functional data field,
  a frame length (DLC), indicating the size of the frame or the size of the functional data field (in bytes),
  the functional data field (Di), containing the command data (for example for controlling a screen),
  a checksum (CRC), for allowing the receiving slave component OEj to check that the received frame has not been altered during transmission.

A header frame $T_H$ contains the following fields, always transmitted in the same order:
  a synchronization field (SYNC), indicating the start of the frame,
  a field (DEV ADDR) indicating the component (serializer, deserializer or slave microcontroller) to which the frame is addressed,
  an identifier (ID), which makes it possible for the application of the receiving slave component OEj to know how to decode the functional data field,
  a frame length (DLC), indicating the size of the requested frame (in bytes).

A read frame $T_L$ contains the following fields, always transmitted in the same order:
  a first field (ACK), indicating the start of the frame,
  a functional data field (Di), containing command data (for example the data generated by a touchscreen, indicating what part of the screen is being touched by a user),
  a checksum (CRC), for allowing the receiving master component OM to check that the received frame has not been altered during transmission.

The (control) method, according to the invention, comprises a step that is carried out each time a timeslot ct, having a first duration dct and intended for the transmission of at least one non-video data frame by an emitter component OM or OEj, starts.

In this case, at the start of a timeslot ct, a first delay temp1 of a second duration $d_{temp1}$ strictly less than the first duration dct (of the timeslot ct in question) is triggered in the emitter component OM or OEj, and, at the end of this first delay temp1, if the non-video data frame has not been fully transmitted, the emitter component OM or OEj that is transmitting this non-video data frame is forbidden to finish the transmission thereof. It will be appreciated that this interruption to the transmission of the end $pt_{nt}$ of the frame (when the second duration $d_{temp1}$ of the first delay temp1 elapses) is for preventing a collision in the following timeslot ct between this end $pt_{nt}$ of the frame and a following frame, so that the following frame is not also lost.

For its part, the receiver component OEj or OM has received a truncated frame $pt_t$, and is thus left waiting for the end $pt_{nt}$ of this frame. To prevent the receiver component OEj or OM from interpreting the start of the following frame, transmitted by the emitter component OM or OEj, as the continuation of the preceding truncated frame $pt_t$, it is proposed that, in the step of the method, in the timeslot ct, a second delay temp2 is triggered in the receiver component OEj or OM, the second delay temp2 having a third duration $d_{temp2}$ in the range between the second $d_{temp1}$ and first dct durations. Then, if the end of the second delay temp2 occurs while the non-video data frame has not been fully received by the receiver component OEj or OM, the incomplete data $pt_t$ of this non-video frame that have been received by the component (OEj or OM) are deleted therein.

Thus, when the emitter component OM or OEj transmits the following frame, in the following timeslot ct, to the receiver component OEj or OM, the receiver component (OEj or OM) interprets the first data received in this following timeslot as the start of a new frame, and not as the continuation of the preceding truncated frame. As a result, the receiver component OEj or OM is does not risk becoming desynchronized from the emitter component OM or OEj, and thus the risk of losing the bidirectional LVDS communication is reduced. Moreover, it is now certain that the receiver component is available for new reception from the start of the following timeslot ct.

It will be noted that it is not obligatory for the second delay temp2 to be triggered in the same manner in a receiver slave component OEj and in a receiver master component OM.

Specifically, in the method step, when the receiver component is a slave component OEj, the second delay temp2 (of a third duration $d_{temp2}$) may be triggered at the start of the reception of the non-video data frame by this receiver slave component OEj.

By contrast, in the method step, when the receiver component is a master component OM, the second delay temp2 (of a third duration $d_{temp2}$) may be triggered at the start of the timeslot ct used by the emitter slave component OEj to transmit the non-video data frame.

This very slight difference in the triggering times of the second delay temp2 results from the fact that the master component OM knows, by checking the table and from the synchronization of the network RC, when each timeslot ct starts (the start thus also acts as a triggering reference for the component), whereas the slave component OEj only has the time when it starts to receive the first byte of a frame as a triggering reference.

For example, the third duration $d_{temp2}$ may be in the range between 3.5 ms and 4.5 ms when the first duration dct is equal to 5 ms. In this case, the third duration $d_{temp2}$ may for example be selected equal to 4 ms.

The third duration $d_{temp2}$ is generally selected as a function of the precision of the internal clocks with which the components OM and OEj are equipped. This third duration $d_{temp2}$ is thus selected as high as possible by comparison with the first duration dct, while leaving a margin at least for the clock drifts and optionally for the end of the transmission of a last byte of the frame.

The method may be implemented by a control device DC. As is shown in a non-limiting manner in FIG. 1, each component OM, OEj may be equipped with a control device DC of this type. However, in a variant embodiment (not shown), each control device DC could be coupled to a master component OM or slave component OEj.

In particular, each control device DC is responsible, when the component thereof is emitting, for triggering the first delay temp1 at the start of each timeslot ct during which it has to transmit a frame, and for checking whether this frame has been fully transmitted when the associated first delay temp1 elapses (at the end of the second duration $d_{temp1}$). If this frame has not been fully transmitted, the control device DC forbids the emitter component thereof to finish the transmission thereof. Each control device DC is also responsible, when the component thereof is receiving and thus receives, in a timeslot ct, a non-video data frame transmitted by an emitter component, for triggering the second delay temp2 (of a third duration $d_{temp2}$ in the range between the second $d_{temp1}$ and first dct durations), and, when the end of this second delay temp2 occurs while the non-video data frame has not been fully received, for ordering the deletion in the receiver component thereof of the received data $pt_t$ of this non-video data frame.

Each control device DC may be implemented in the form of program modules (or software) or of electronic circuits (or hardware), or else of a combination of electronic circuits and program modules. It will be noted that each control device DC may be treated as an automaton.

Figure 2:
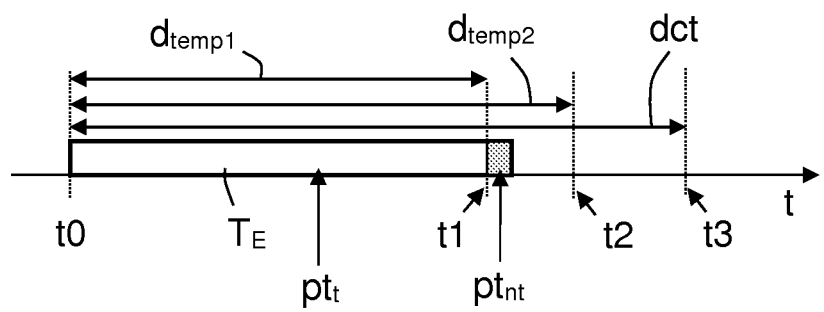

FIG. 2 schematically shows an exemplary time diagram for improving the ease of comprehension of the invention.

At time t0 an emitter component, for example the master component OM, starts to transmit a write frame $T_E$ in the timeslot ct, which is defined in the table it stores, and thus the control device DC thereof triggers the first delay temp1. As a result, this timeslot ct and thus the first associated delay temp1 (of duration $d_{temp1}$) starts at this same time t0. From this time t0, the emitter master component OM has a duration $d_{temp1}$ available for transmitting this write frame $T_E$, in the timeslot ct, to a receiver slave component, for example OE1. The end of this duration $d_{temp1}$ elapses at a time t1 (where $t1=t0+d_{temp1}$).

Once the receiver slave component OE1 starts to receive the write frame $T_E$ in this same timeslot, the control device DC thereof triggers the second delay temp2 of duration $d_{temp2}$.

In this example, at the time t1, only a part $pt_t$ of the write frame $T_E$ has been transmitted and received by the receiver slave component OE1. As a result, the control device DC of the emitter master component OM forbids the component (OM) from completing the transmission thereof (the part $pt_{nt}$ is thus not transmitted to the receiver slave component OE1). The transmitted part $pt_t$ of the write frame $T_E$ is visualized in white, and the non-transmitted part $pt_{nt}$ of the write frame $T_E$ is visualized in grey.

At a time t2, the duration $d_{temp2}$ of the delay temp2 ends in the receiver slave component OE1 ($t2=t0+d_{temp2}$) Because the receiver slave component OE1 has not received the entirety of the write frame $T_E$ (the length of which is defined by the length field of the header or the write frame $T_E$) at this time t2, its control device DC orders it to delete from its receiving memory the data of the transmitted part $pt_t$ that it has just received. The write frame $T_E$ is thus lost, but the synchronization and the communication with the master component OM are preserved.

The method makes it possible to provide determinism and robustness of the transmissions between two components (or nodes) of the communication network, while defending against potential collision problems and guaranteeing that the receiver component will always be available for new reception from the start of the following timeslot.

The invention claimed is:

1. A method for controlling the transmission of frames by a master component and at least one slave component of a communication network capable of bidirectional transmission of non-video data frames, in timeslots defined by a table, and of unidirectional transmission of video data frames, said method comprising a step in which, when a timeslot having a first duration and intended for the transmission of at least one non-video data frame by an emitter component starts, a first delay of a second duration strictly less than said first duration is triggered, and, when the end of this first delay occurs while the non-video data frame has not been fully transmitted, the emitter component is prevented from finishing its transmission, wherein, when a receiver component receives said non-video data frame in said timeslot, a second delay of a third duration in the range between the second and first duration is triggered in said receiver component, and, if the end of this second delay occurs before the non-video data frame has been fully received, the received data of this non-video data frame are deleted in the receiver component.

2. The method according to claim 1, wherein, when said receiver component is a slave component, said second delay of a third duration is triggered at the start of the reception of said non-video data frame by this receiver slave component.

3. The method according to claim 1, wherein, when said receiver component is a master component, said second delay of a third duration is triggered at the start of said timeslot used by said emitter slave component for transmitting the non-video data frame.

4. The method according to claim 1, wherein said third duration is in the range between 3.5 ms and 4.5 ms when the first duration is equal to 5 ms.

5. A device for controlling the transmission of frames by a master component or a slave component of a communication network capable of bidirectional transmission of non-video data frames in timeslots defined by a table and having a first duration, and of unidirectional transmission of video data frames when the master component or slave component is operating as an emitter, wherein, the device is adapted to:
   trigger a first delay of a second duration strictly less than the first duration either upon receipt of the non-video data frame or at the start of transmission of the non-video data frame;
   prevent completion of the transmission of the non-video data frame if transmission of the non-video data frame is not complete by the end of the first delay; and
   initiate a second delay of a third duration in the range between said second and first durations, and if the end of said second delay occurs before said non-video data frame has been fully received, order the deletion in its receiver component of received data of this non-video data frame.

6. A component suitable for connection to a communication network capable of bidirectional transmission of non-video data frames, in timeslots defined by a table, and of unidirectional transmission of video data frames, wherein said component comprises a control device according to claim 5.

7. A vehicle comprising a communication network capable of bidirectional transmission of non-video data frames, in timeslots defined by a table, and of unidirectional transmission of video data frames, wherein the vehicle comprises at least two components according to claim 6, which are connected to the communication network.

8. The vehicle according to claim 7, wherein said communication network is of the so-called low-voltage differential signaling type.

9. The vehicle according to claim 7, wherein said vehicle is a motor vehicle.

* * * * *